(12) United States Patent  (10) Patent No.: US 8,598,731 B2
Pitre  (45) Date of Patent:  Dec. 3, 2013

(54) RIMMED TURBINE

(75) Inventor: John Pitre, Honolulu, HI (US)

(73) Assignee: Natural Power Concepts, Inc., Honolulu, HI (US)

(*) Notice: Subject to any disclaimer, the term of this patent is extended or adjusted under 35 U.S.C. 154(b) by 488 days.

(21) Appl. No.: 12/461,719

(22) Filed: Aug. 21, 2009

(65) Prior Publication Data

US 2010/0140951 A1  Jun. 10, 2010

Related U.S. Application Data

(60) Provisional application No. 61/189,950, filed on Aug. 22, 2008.

(51) Int. Cl.
  *F03D 9/00* (2006.01)
  *H02P 9/04* (2006.01)
(52) U.S. Cl.
  USPC .......................................................... 290/55
(58) Field of Classification Search
  USPC .......... 290/43, 44, 54, 55; 416/111, 117, 119, 416/132 B, 223 R; 415/1, 2.1, 4.1, 4.2, 4.5, 415/905, 908
  See application file for complete search history.

(56) References Cited

U.S. PATENT DOCUMENTS

| 1,461,048 | A | | 7/1923 | Roman | |
|---|---|---|---|---|---|
| 3,942,839 | A | | 3/1976 | Chalk | |
| 4,289,970 | A | | 9/1981 | Deibert | |
| 4,330,714 | A | * | 5/1982 | Smith | 290/55 |
| 5,203,672 | A | * | 4/1993 | Wolf | 415/2.1 |
| 5,295,793 | A | | 3/1994 | Belden | |
| 5,823,749 | A | * | 10/1998 | Green | 416/132 B |
| 6,064,123 | A | | 5/2000 | Gislason | |
| 6,957,946 | B1 | | 10/2005 | Vander Kley | |
| 2004/0169376 | A1 | * | 9/2004 | Ruer et al. | 290/55 |
| 2008/0069696 | A1 | | 3/2008 | Ball | |
| 2012/0112465 | A1 | * | 5/2012 | Morrison | 290/55 |

FOREIGN PATENT DOCUMENTS

| DE | 2951635 A1 | 7/1981 |
|---|---|---|
| DE | 202010003654 U1 | 7/2011 |
| JP | 2007127113 A | 5/2007 |
| WO | WO-97/13979 A1 | 4/1997 |
| WO | WO-0034650 A1 | 6/2000 |
| WO | WO-0036299 A1 | 6/2000 |
| WO | WO-2004/092580 A1 | 10/2004 |
| WO | WO-2008091162 A1 | 7/2008 |

OTHER PUBLICATIONS

"Wind Turbine Technology—Overview", New York State Energy Research and Development Authority, Oct. 2005.

(Continued)

*Primary Examiner* — Javaid Nasri
(74) *Attorney, Agent, or Firm* — Novak Druce Connolly Bove + Quigg LLP

(57) ABSTRACT

A wind power extraction device has a rotor with a hub and a rim coupled to the hub through a plurality of blades. The blades rotate the rotor about an axis of rotation passing through the hub in response to a wind moving generally parallel to the axis of rotation. A mount coupled to the rotor extends and retracts the rotor between a first configuration aligning the rotor axis of rotation substantially horizontally, and a second configuration aligning the rotor axis of rotation substantially vertically. The device may have components of an electric generator mounted in or near the rim.

17 Claims, 10 Drawing Sheets

(56) References Cited

OTHER PUBLICATIONS

"20% Wind Energy by 2030: Increasing Wind Energy's Contribution to U.S. Electricity Supply," U.S. Department of Energy, Jul. 2008.
Koerner, "Honeywell Wind Turbine to be Sold at Ace Hardware Stores for $4,500," Jetson Green, <http://www.jetsongreen.com/2009/06/honeywell-wind-turbine-wt6000-earthtronics.html>, Jun. 8 2009.
International Search Report and Written Opinion, International App. No. PCT/US2009/004773, dated May 10 2010.
United Kingdom Search and Examination Report dated Feb. 19, 2013.
United Kingdom Search and Examination Report dated Nov. 1, 2012.

* cited by examiner

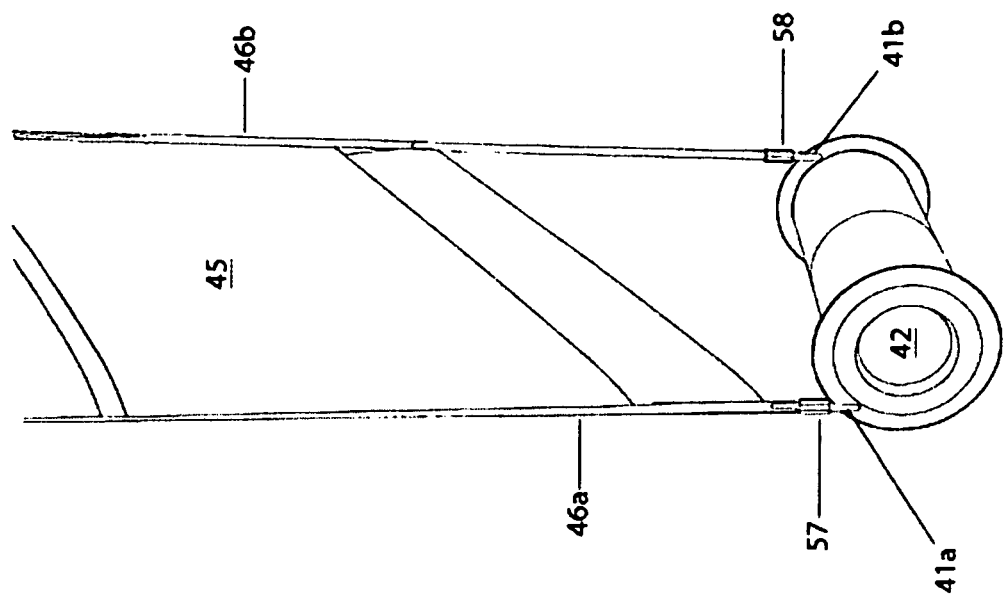
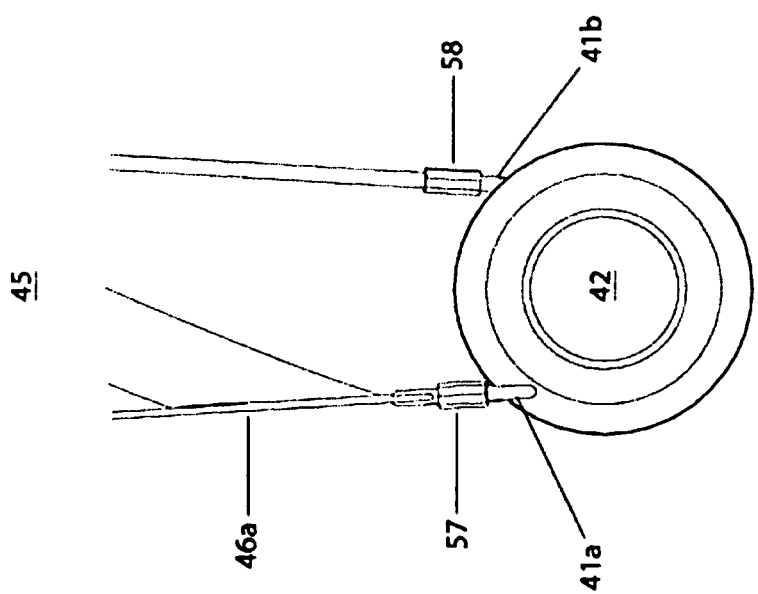

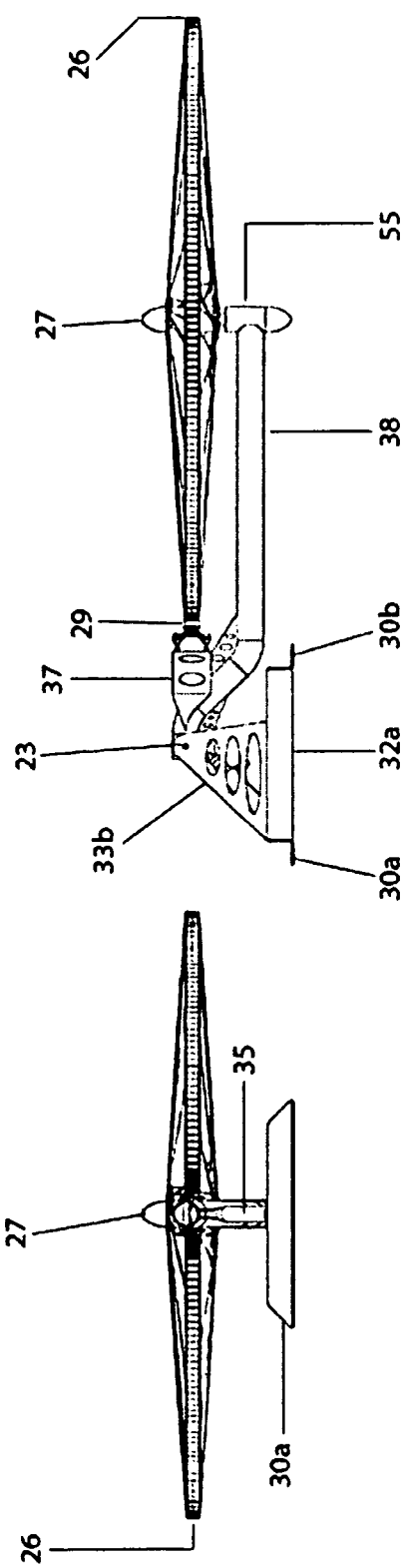

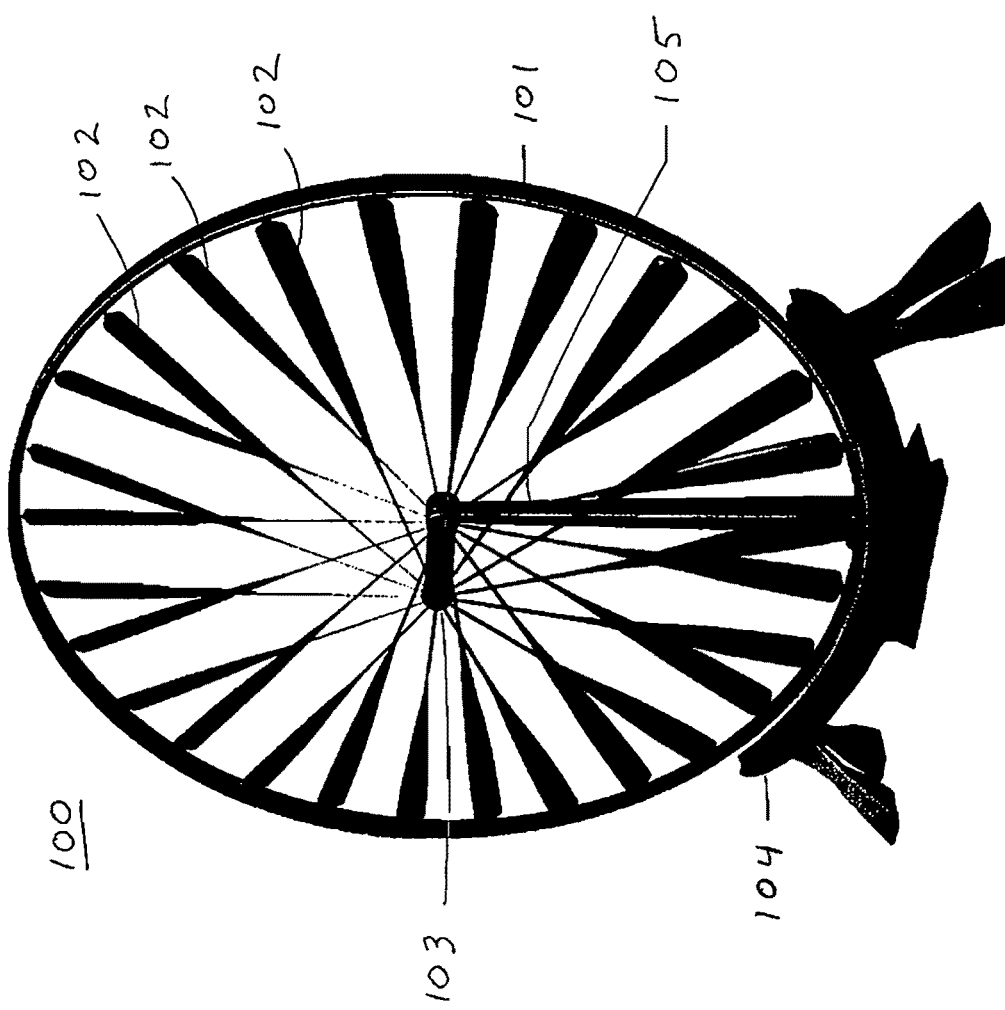

RIMMED TURBINE

CROSS-REFERENCE TO RELATED APPLICATIONS

This application claims priority to U.S. Provisional Patent Application 61/189,950 entitled, "Fine Arts Innovations," and filed Aug. 22, 2008, the disclosure of which is incorporated herein by reference in its entirety.

STATEMENT REGARDING FEDERALLY SPONSORED RESEARCH OR DEVELOPMENT

None.

NAMES OF THE PARTIES TO A JOINT RESEARCH AGREEMENT

None.

BACKGROUND

According to the U.S. Department of Energy, modern, wind-driven electricity generators were born in the late 1970's. See "20% Wind Energy by 2030," U.S. Department of Energy, July 2008. Until the early 1970s, wind energy filled a small niche market supplying mechanical power for grinding grain and pumping water, as well as electricity for rural battery charging. With the exception of battery chargers and rare experiments with larger electricity-producing machines, the windmills of 1850 and even 1950 differed very little from the primitive devices from which they were derived. As of July 2008, wind energy provided approximately 1% of total U.S. electricity generation.

As illustrated in FIG. 1, most modern wind turbines typically have 3-bladed rotors 10 with diameters of 10-80 meters mounted atop 60-80 meter towers 12. The average turbine installed in the United States in 2006 can produce approximately 1.6 megawatts of electrical power. Turbine power output is controlled by rotating the blades 10 around their long axis to change the angle of attack (pitch) with respect to the relative wind as the blades spin around the rotor hub 11. The turbine is pointed into the wind by rotating the nacelle 13 around the tower (yaw). Turbines are typically installed in arrays (farms) of 30-150 machines. A pitch controller (for blade pitch) regulates the power output and rotor speed to prevent overloading the structural components. Generally, a turbine will start producing power in winds of about 5.36 meters/second (12 miles per hour) and reach maximum power output at about 12.52-13.41 meters/second (28-30 miles per hour). The turbine will pitch or feather the blades to stop power production and rotation at about 22.35 meters/second (50 miles per hour).

In the 1980s, an approach of using low-cost parts from other industries produced machinery that usually worked, but was heavy, high-maintenance, and grid-unfriendly. Small-diameter machines were deployed in the California wind corridors, mostly in densely packed arrays that were not aesthetically pleasing in such a rural setting. These densely packed arrays also often blocked the wind from neighboring turbines, producing a great deal of turbulence for the downwind machines. Little was known about structural loads caused by turbulence, which led to the frequent and early failure of critical parts. Reliability and availability suffered as a result.

SUMMARY

An objective of the invention is to provide a wind turbine adapted for use at modest wind speeds while also being capable of surviving high winds. Other objects include:
1. providing a wind turbine for retrofit onto buildings and other structures;
2. providing a wind turbine with a high degree of blade area;
3. providing a wind turbine of high strength; and
4. providing a wind turbine of light weight.

These and other objectives are obtained by providing, in various embodiments herein, a wind turbine having a circular outer rim and multiple blades held in tension between the rim and central hub. The blades attach to the hub at two or more points along the hub axis giving the rotor an appearance suggestive of a bicycle wheel. Blades preferably are made of woven material which may be reinforced and stiffened. Magnetic elements in the rim rotate past coils attached to a non-rotating frame to produce electricity. A mount attaches the rotating components to a foundation and allows the rotating components to pivot between different orientations. In an elevated orientation, the rim face is vertical and exposed to the wind to produce electricity. In a retracted position, the rim face is horizontal and protected from the wind for safety. An actuator rotates the rotating components between the elevated and retracted positions.

BRIEF DESCRIPTION OF THE SEVERAL VIEWS OF THE DRAWING

Reference will be made to the following drawings, which illustrate preferred embodiments of the invention as contemplated by the inventor(s).

FIGS. 4a and 4b are front and perspective views respectively of the hub portion of the rimmed turbine of FIG. 2.

FIGS. 5a and 5b are front and side views respectively of the rimmed turbine of FIG. 2 in a retracted elevated position.

FIG. 10 is a perspective view of an alternate rimmed turbine.

DETAILED DESCRIPTION OF THE INVENTION

Figure 1:
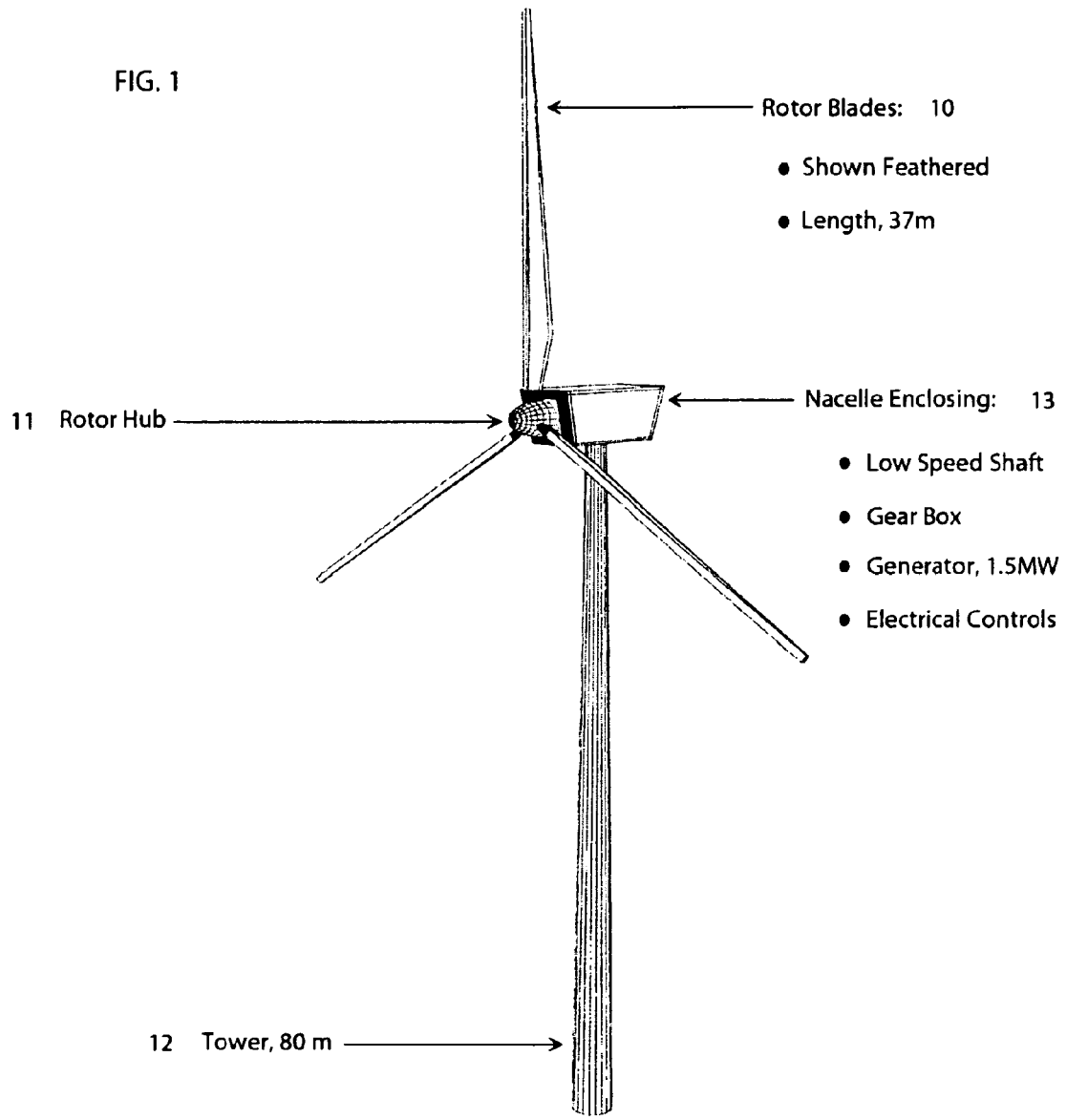
FIG. 1 is an illustration of a prior art wind turbine.
Figure 2:
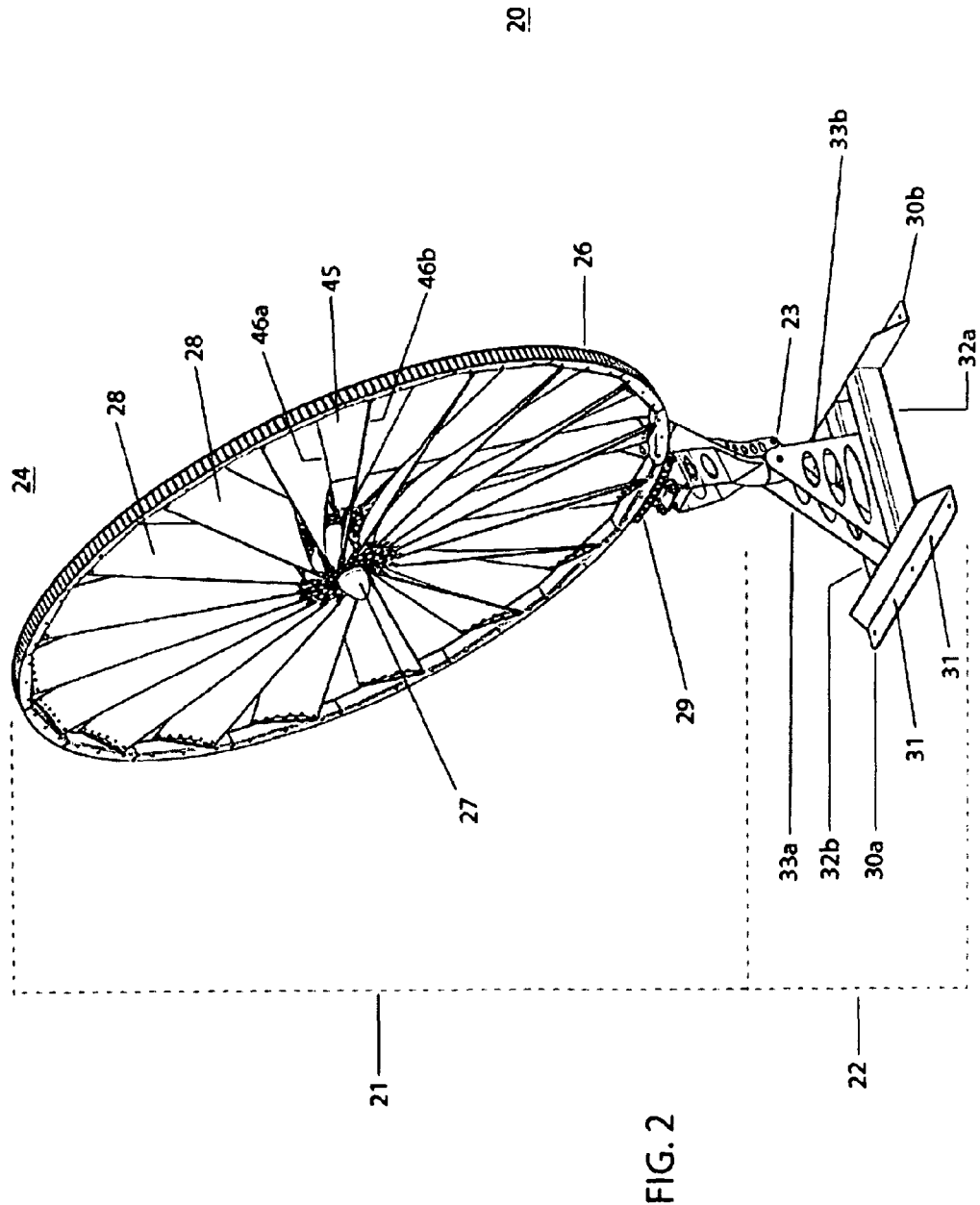
FIG. 2 is a perspective drawing of an exemplary rimmed turbine.

FIG. 2 is a perspective drawing of an exemplary rimmed turbine 20. The turbine includes a retractable portion 21 and a non-retractable portion 22 connected at a pivotal joint 23. The illustrated embodiment is shown with a single pivot point 23, though other pivotal joint arrangements may be used.

The retractable portion 21 includes a rotating portion 24 having a circular rim 26 connected to a central hub 27 through generally radial blades 28. Fewer than all blades 28 are designated with reference numerals to avoid drawing clutter, but it should be understand that blades 28 can extend substantially equidistantly around the entire circumference of hub 27. Each blade 28 has an aerodynamic shape selected to exert a torque that rotates the rim 26 and hub 27 about an axis of rotation at the geometric center of the rim 26. The blades 28 are shaped to cause this rotation in response to a prevailing wind moving generally parallel to the axis of rotation. (Preferably, the wind would be precisely parallel, though it may be (and often is) off axis.) The hub 27 lies along the axis of rotation with one end of the axis directed upwind and the other end of the axis directed downwind. The rim 26 and blades 28 rotate about the hub analogously to the way the rim of a bicycle wheel rotates about an axle.

The non-rotating portion 25 of the retractable portion 21 connects to the hub 27 as will be discussed further below. A number of electrically conductive coils 29 are positioned on the non-rotating portion 25 to be close to the rim 26. The coils 29 preferably are attached to the non-rotating portion 25, though other arrangements and/or locations for positioning the coils 29 may be used. The outer periphery of the rim 26 carries magnetic elements, which preferably are permanent magnets but may be electro-magnets. The coils 29 are adapted to function as stator coils of an electric generator, and the magnetic elements of the rim 26 are adapted to function as elements of an electric generator, as discussed in further detail below. While the embodiment of FIG. 2 uses generator elements located around the periphery of the rim 26, generator components may be located elsewhere, such as at the hub 27 or remotely from the rotating portion 21 by use of a mechanical transmission.

The non-retractable portion 22 is adapted to support the retractable portion 21 on a fixed foundation. For purposes of illustration, it will be assumed that the foundation has a horizontal orientation, such as a horizontal rooftop, though the apparatus may be mounted to other foundations. The force of wind acting on the retractable portion 21 imparts a thrust load which the non-retractable portion 22 transfers to the foundation along with the weight of the entire apparatus.

The non-retractable portion 22 illustrated in FIG. 2 is one example of many possible arrangements and is not meant to be a limiting example. The exemplary arrangement of FIG. 2 has two right-angle brackets 30*a*, 30*b*, each positioned parallel to, but spaced apart from the other by a distance suitable to transfer the thrust load and other loads caused by the wind and the weight of the apparatus. Each bracket 30*a* is adapted to fasten to a horizontal foundation (not shown), such as a roof top, through bolt holes 31. Multiple cross pieces 32*a*, 32*b* extend between the brackets 30*a*, 30*b* and support a pair side plates 33*a*, 33*b* that extend vertically up and away from the foundation. Fewer than all cross pieces are designated with reference numerals to avoid drawing clutter, but it should be understand that the non-retractable portion 22 may have additional cross pieces. The side plates 33*a*, 33*b* support a pivotal joint 23.

The exemplary arrangement of FIG. 2 does not provide for yaw (i.e., rotation about a vertical axis), but a yaw capability may be provided by attaching the non-retractable portion 22 to a turntable, or other known means of rotation. Yaw may be desirable to keep the rim 26 facing squarely into the wind, which optimizes energy capture. Yaw also may desirable as a protective measure in high wind to prevent damage.

In a first, operational orientation, the retractable portion 21 extends upward and away from the foundation so that the plane of the rim 26 is generally perpendicular to the direction of the prevailing wind. (Preferably the wind would be precisely perpendicular, although it may be (and often is) off axis.) In such an orientation, the wind exerts a force on the blades 28, which in turn cause the rim 26 to rotate about the hub 27. Magnetic elements attached to the outer periphery of the rim 26 rotate past coils 29 positioned on the non-rotating portion 25, which in turn induce electricity to flow through the coils 29. The electricity may be delivered to additional conditioning circuitry (not shown), such as storage elements, distribution panels, fuses, inverters, etc., selected for the needs of a particular application. The plane of the rim 26 need not be perfectly perpendicular relative to the ground or foundation, such as when the device is positioned on top of a building or other location where the wind might not be perfectly horizontal. The device may function with the wind off axis, though at less than optimum power extraction.

Figure 3B:
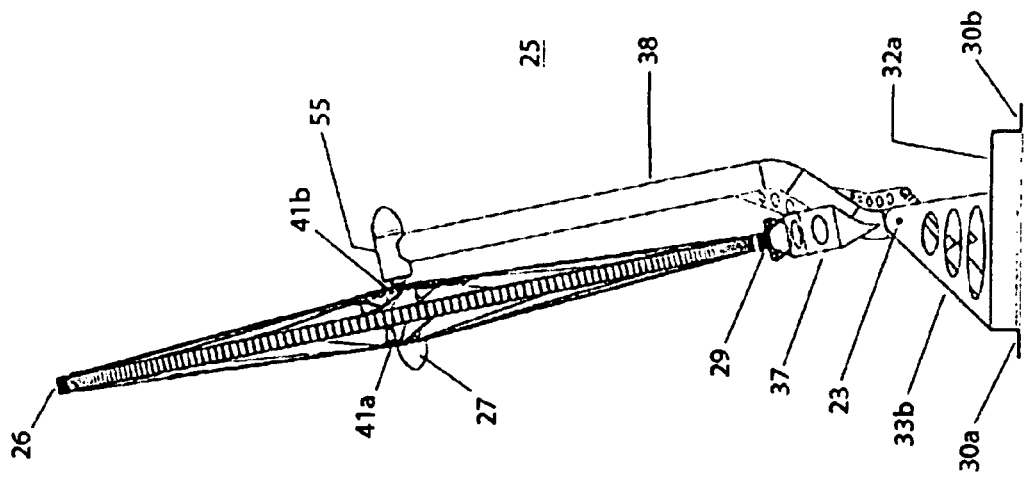
FIGS. 3a and 3b are front and side views respectively of the rimmed turbine of FIG. 2 in an elevated position.
Figure 3A:
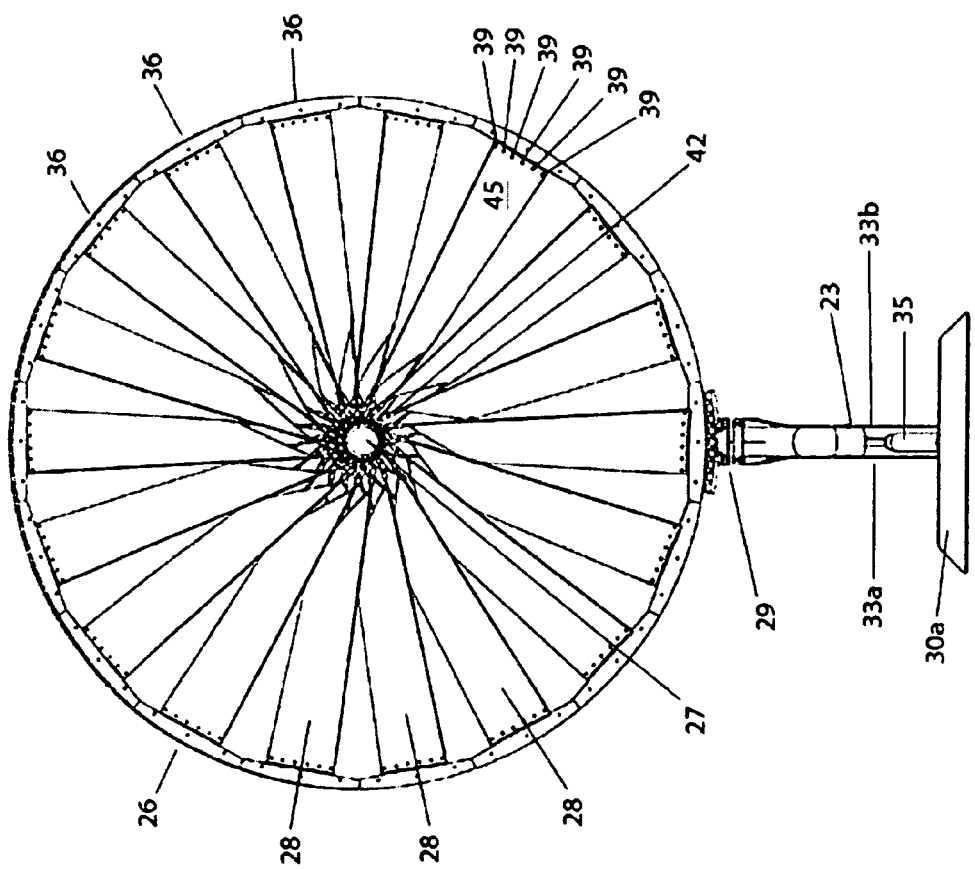

FIGS. 3*a* and 3*b* are front and side views respectively of the rimmed turbine of FIG. 2 in an elevated position. FIG. 3*a* illustrates a number of items described above in connection with FIG. 2, such as: pivotal joint 23; rim 26; hub 27; blades 28; coils 29; bracket 30*a*; and side plates 33*a*, 33*b*. This figure also shows placement of a actuator 35, which is a preferred way of providing motive force to move the retractable portion 21 between the extended and retracted orientations. Other types of actuators may be used. The actuator 35 will be discussed further below in connection with FIG. 7. FIG. 3*a* also illustrates segmentation of rim 26 into rim segments 36. Fewer than all segments 36 are designated with reference numerals to avoid drawing clutter, but it should be understand that rim 26 may be segmented throughout. Each rim segment 36 serves as an anchor point for a blade 28. Blades preferably attach at multiple points to the interior of a rim segment 36 as discussed further below. While the embodiment of FIGS. 3*a* and 3*b* show a segmented rim 26 with one segment per blade, the rim 26 may be made of a different number of segments, or may even be a unitary structure.

FIG. 3*b* illustrates items described above in connection with FIG. 2, such as: pivotal joint 23; rim 26; hub 27; coils 29; brackets 30*a*, 30*b*; and side plate 33*b*. This figure shows additional detail of hub 27, which lies along the axis of rotation of the rotational portion 24 and which is oriented generally parallel to the direction of a prevailing wind when the retractable portion 21 is in the extended orientation. The non-rotating portion 25 includes a swing arm 38 which extends from the pivotal joint 23 to a point along the axis rotation of the rotating portion 21. The swing arm 38 connects to the rotating portion 21 through a spindle (not shown) mounted in a spindle housing 55 as discussed further below in connection with FIG. 5. The non-rotating portion 25 also includes a coil mount 37 for the coils 29 near the pivotal joint 23 as discussed further below in connection with FIG. 6. FIG. 3*b* illustrates the rim 26 and swing arm 38 at an angle other than ninety degrees relative to the crossbar 32*a*, and hence relative to horizontal. Said another way, the swing arm appears to lean to the left. This orientation may be desirable when the apparatus is placed in a wind that is not perfectly horizontal, such as when rising over and crossing a rooftop.

Blades 28 preferably are made from a woven material and held under tension between hub 27 and rim 26. For example, a blade may be woven glass, carbon fiber, Kevlar™ or nylon. The woven material may be impregnated with epoxy or other material to add stiffness and structural integrity. Reinforcing fibers may be added along the leading and trailing edges. The fibers may attach at the hub 27 through an intermediate mechanism such as, preferably, a turnbuckle which allows adjustment of tensile force.

FIGS. 2, 3*a* and 3*b* illustrate aspects of connections of blades to the hub 27 and to the rim 26. Blades 28 have a twist in their orientation from their roots (near the hub 27) to their tips (near the rim 26). As can be seen in the perspective view of FIG. 2, a blade chord (cross section taken from leading edge to trailing edge of the blade) near the root runs relatively closely to parallel to the axis of rotation when compared to a chord taken near the tip. At the tip, a chord runs closer to perpendicular to the axis of rotation. This twist reflects fact that the inner portion of the blade (closer to the hub 27) rotates at a lower tangential velocity than the outer portion (closer to the rim 26). As is known in the art of wind turbines, aerodynamic surfaces have an angle of attack, which is the relative direction at which the blade meets the air, and the angle of attack of a rotating blade depends on tangential velocity. The twist provides a desirable angle of attack along the blade length. The twist also affects minimum dimensions for the axial length of the hub 27 and rim 26, which desirably will be long and wide enough to accommodate the optimal blade orientation at the root and tip.

As seen in FIG. 3a, exemplary blade 45 attaches at six points 39 along a rim segment 36. Six is an exemplary number, and a different number of attachment points may be used.

FIG. 4a is a front view, and FIG. 4b is a perspective view, illustrating attachment of exemplary blade 45 to an axel portion 42 of hub 27. Blade 45 attaches at two points along the axel 42: an upwind point 41a and a downwind point 41b. The leading and trailing edges 46a, 46b preferably attach at different circumferential locations around the axle 42. The leading edge 46a attaches at a point at approximately ten (10) o'clock (viewing the rim face like an analog clock face), while the trailing edge attaches at approximately two (2) o'clock. The angle formed by leading and trailing edges 46a, 46b with the axle 42 (more precisely, with a tangent to the axle 42), is not perfectly radial—that is, not ninety degrees. The attachment angle for leading edges is complementary to attachment angles for trailing edges. For example, as can be seen from FIG. 4a, the tension of the connection of the leading edge 46a would cause a torque on the axle 42 tending to cause it to rotate in a first direction, which in the example of the figure would be a clockwise rotation. The tension of trailing edge 46b would cause a cancelling torque in the opposite direction, which in the example of the figure would be a counter-clockwise direction. The leading and trailing edges function analogously to spokes on a bicycle wheel to provide structural rigidity and stability of the circular shape.

FIGS. 5a and 5b are front and side views respectively of the rimmed turbine of FIG. 2 in a retracted position. These figures further illustrate items described in connection with prior figures, such as: pivotal joint 23; rim 26; hub 27; coils 29; brackets 30a, 30b; crossbar 32a; side plate 33b, actuator 35; swing arm 38; and spindle housing 55.

Figure 6:
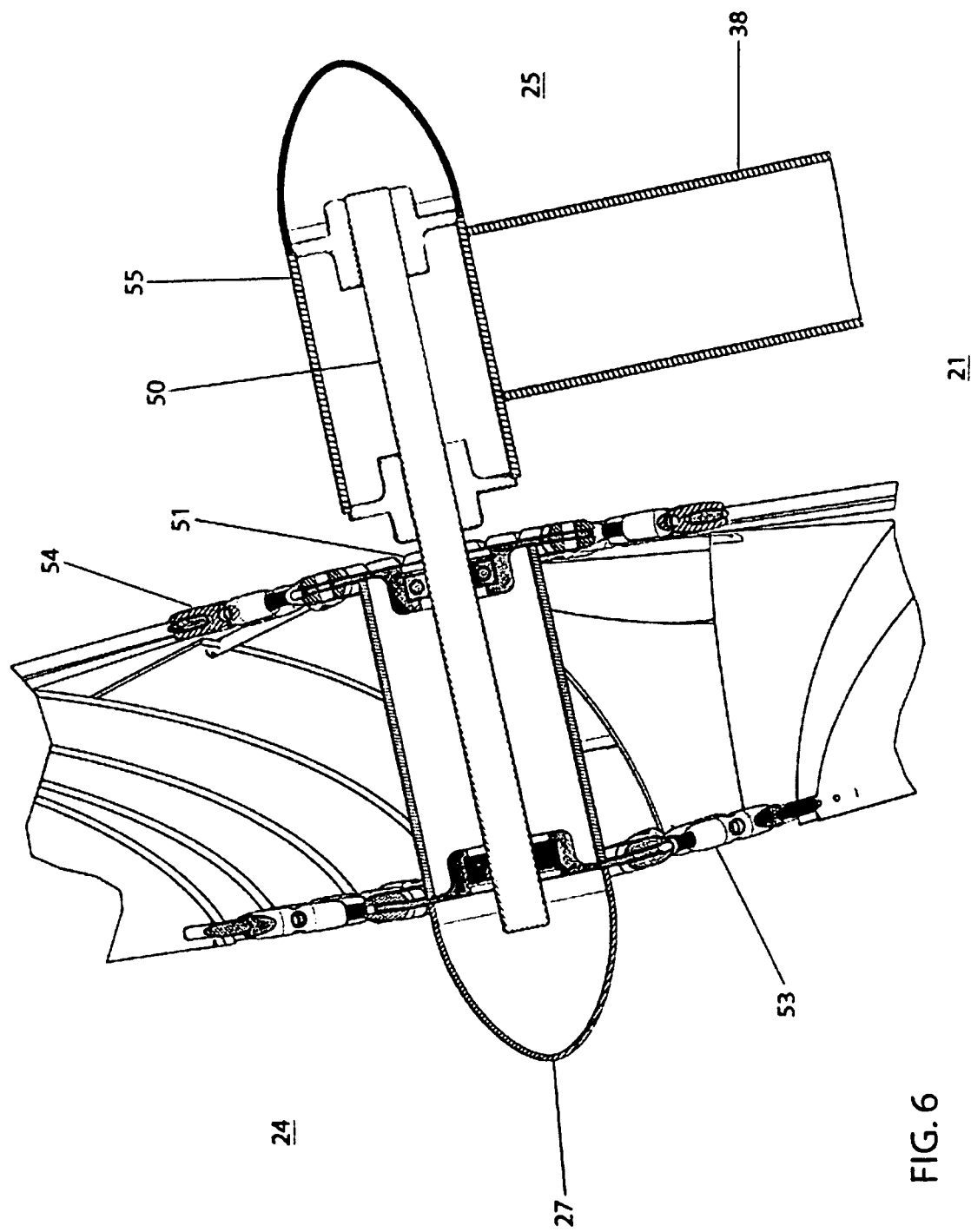
FIG. 6 is a detailed, cross-sectional view of a hub portion of the rimmed turbine of FIG. 2.

FIG. 6 is a detailed, cross-sectional view of the hub 27 of the rimmed turbine of FIG. 2. This figure illustrates items described in connection with prior figures, such as: hub 27; blades 28; swing arm 38; and spindle housing 55. FIG. 6 further illustrates attachment of the rotating portion 24 to the non-rotating portion 25. A spindle 50 attaches rigidly to the spindle housing 55, which in turn attaches rigidly to the swing arm 38. The spindle 50 extends beyond the spindle housing 55 into the interior of the hub 27 along the hub central axis. Bearings 51, 52 allow the hub 27 to rotate about the spindle 50. At least one of the bearings 51, 52 is a thrust bearing that prevents the hub 27 from sliding along the spindle 50. FIG. 6 also illustrates in more detail a leading edge turnbuckle 53 and a trailing edge turnbuckle 54 used to connect blades 28 to the hub 27.

Figure 7:
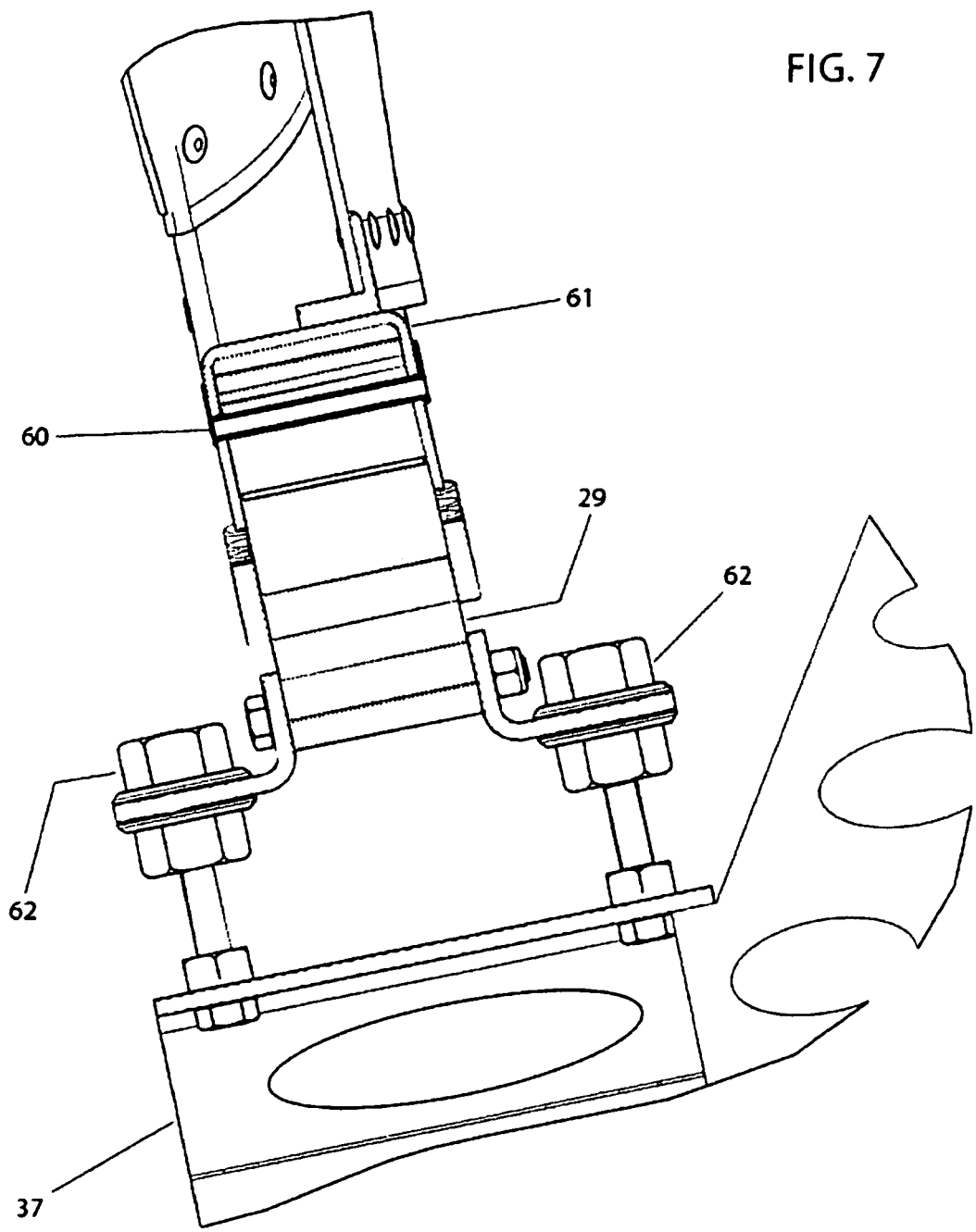
FIG. 7 is a detailed, cross-sectional view of a generator portion of the rimmed turbine of FIG. 2.

FIG. 7 is a detailed, cross-sectional view of a generator portion of the rimmed turbine of FIG. 2. This figure illustrate parts of the rotating portion 24 and the non-rotating portion 25 separated by a gap 60. Magnetic elements 61 attached to the outer periphery of the rotor rim 26 pass on one side of the gap 60. Coils 29 held in place by the coil mount 37 remain fixed on the opposite side of the gap 60 from the magnetic elements 29. Adjustment screws 62 allow radial adjustment of the coils 29 to widen or narrow the gap 60.

Figure 8:
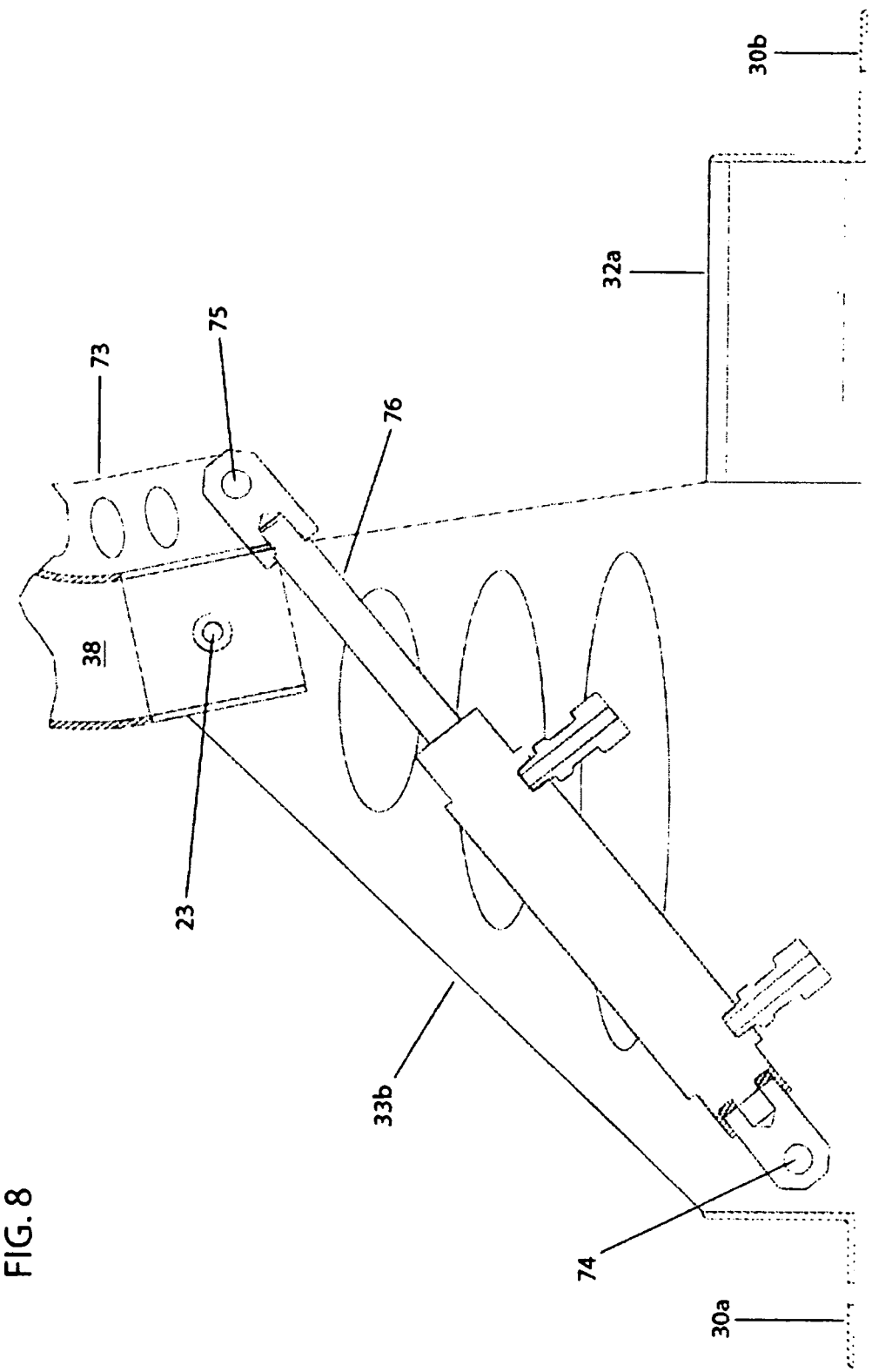
FIG. 8 is a detailed, side view of a mount portion of the rimmed turbine of FIG. 2.

FIG. 8 is a detailed, cut-away view of a mount portion of a rimmed turbine of FIG. 2. This figure further illustrate items described in connection with prior figures, such as: brackets 30a, 30b; side plate 33b; and swing arm 38. This view further illustrates actuator 35, which attaches at a first end 74 to side plates 33a, 33b, and at a second end 75 to a swing arm bracket 73. The swing arm bracket 73 attaches to the swing arm, and the attachment point for the second end 75 of the actuator 35 is offset from the pivotal joint 23. For a hydraulic actuator, hydraulic fluid may be pumped into and out of the actuator 35 through ports 71, 72 to stroke (extend and retract) a piston 76, which rotates the arm 38 about the pivotal joint 23 and in turn extends and retracts the retractable portion 21.

Figure 9:
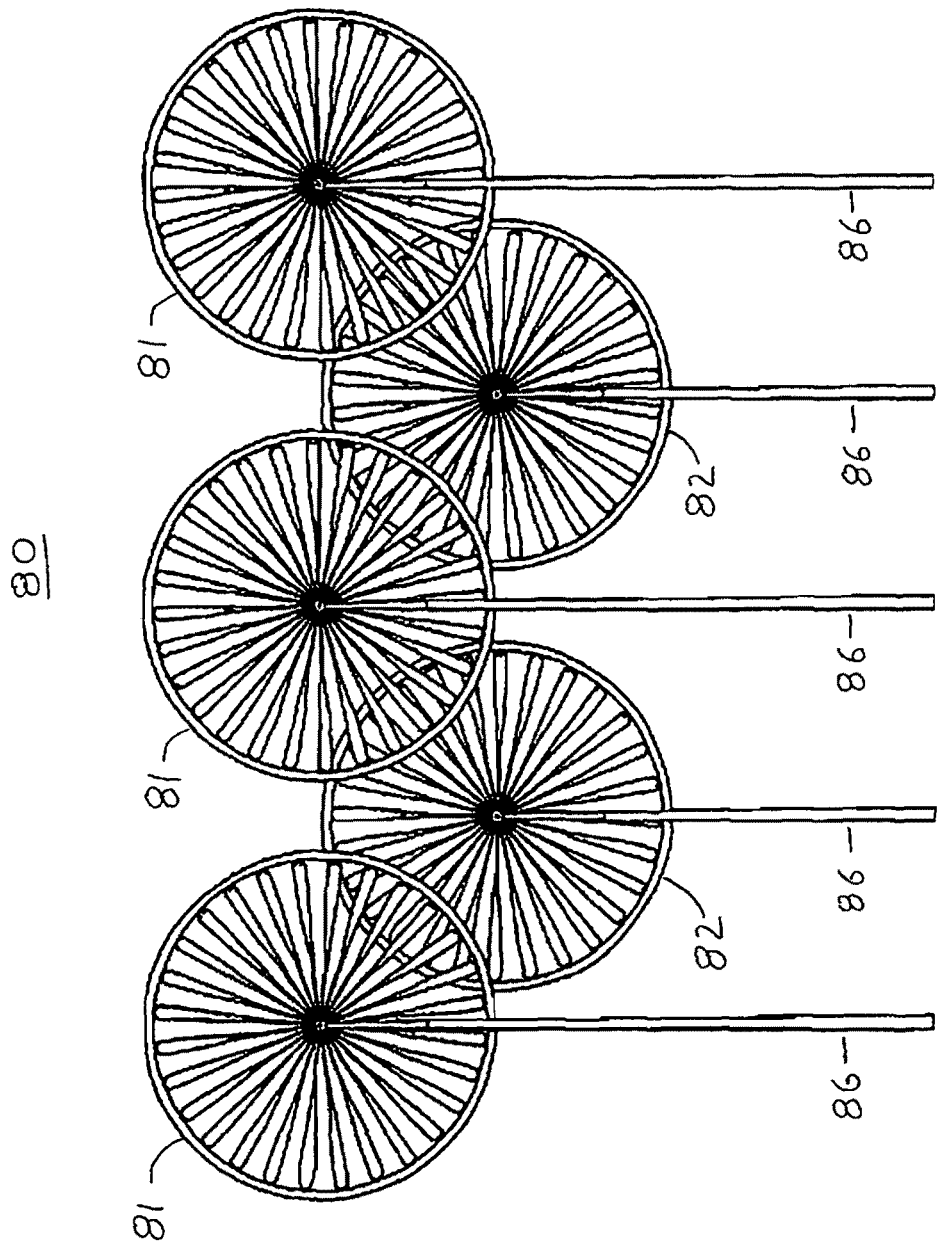
FIG. 9 is a front view of an array of rimmed turbines.

FIG. 9 is a front view of an alternated embody of rimmed turbines. This embodiment includes an array 80 consisting of five rimmed turbines. Each turbine includes a rotating portion having a rim, blades, and hub similar to rims, blades, and hubs described above. All rims have approximately the same diameter. Each turbine also includes magnetic elements and coils similar to the magnetic elements and coils described above. The turbines in the embodiment of FIG. 9 may have fixed bases 86, such as monopole pillars, which lack a pivotal joint.

The turbines may be placed in a fixed orientation with the planes of all the rims generally parallel. The rotational axes of the rims preferably are aligned in two rows. An upper row has three turbines 81, with rim centers evenly spaced along an upper, generally horizontal line at separation distances that exceed the rim diameters. When viewed face on, the rims would not appear to overlap. A lower row has two turbines 82 with rim centers spaced along a lower, generally horizontal line. Each rim is centered laterally at a point equidistant from two rims of the upper line. The separation between the lower line and the upper line is less than a rim diameter. When viewed face on, each rim of the lower line would appear to overlap two rims of the upper line in a pattern suggestive of the well-known, overlapping rings that symbolize the Olympic Games. The diameters of the turbines 81, 82 and the relative distances and angles therebetween can be chosen to simulate the specific proportions of the Olympic symbol.

FIG. 10 illustrates an alternate, rimmed turbine 100. This turbine includes a rim 101 connected by blades 102 to a central hub 103. Similar to other embodiments, magnetic elements preferably attach to the outer periphery of rim 101. The central hub 103 connects through an arm 105 to a non-rotating portion 104. Coils are positioned on the non-rotating portion 104 in proximity to the magnetic elements on the rim 101 so that the passage of magnetic elements past the coils induces an electric current. Alternately, a shaft of a rotational generator may be coupled to the hub 103 or to the rim 101.

Blades 102 of the embodiment of FIG. 10 attach at a single point along the hub 103. The attachment alternates for every second blade 102. A first blade attaches at an upwind location, while the prior and following blades attach at a downwind location on the hub 103. Blades 102 are held under tension and function analogously to spokes on a bicycle wheel to connect the rim 101 to the hub 103. While the embodiment of FIG. 10 is shown attached to a fixed (non-pivoting) mount, the arrangement of the rim 101, blades 102, and hub 103 may be used in place of the rim, blades, and hubs of the embodiments of FIGS. 2-9.

The embodiments described above are intended to be illustrative but not limiting. Various modifications may be made without departing from the scope of the invention. The breadth and scope of the invention should not be limited by the description above, but should be defined only in accordance with the following claims and their equivalents.

What is claimed is:

1. A wind power extraction device comprising:
   a rotor having,
   (i) a hub, and
   (ii) a rim coupled to the hub through a plurality of blades adapted to rotate the rotor about an axis of rotation passing through the hub in response to a wind moving generally parallel to the axis of rotation; and
   the plurality of blades extend from the hub to the rim, and twist in orientation from root to tip;
   wherein the plurality of blades are configured such that each blade only induces rotation of the rotor in one direction.

2. A device as in claim 1 wherein:
   a leading edge of a blade of the plurality of blades couples to the hub at a first point having a first axial position along the axis of rotation and first circumferential orientation around the axis of rotation; and
   a trailing edge of the blade couples to the hub at a second point having:
   (i) a second axial position displaced remotely along the axis of rotation from the first axial position; and
   (ii) a second circumferential position displaced remotely around the axis of rotation from first circumferential position.

3. A device as in claim 1 wherein the plurality of blades couple between the hub and the rim under tension.

4. A device as in claim 1 wherein a blade of the plurality of blades connects to at least one of the hub and rim through a tension adjusting device.

5. A device as in claim 4 wherein the tension adjusting device is a turnbuckle.

6. A device as in claim 1 wherein a blade of the plurality of blades is made of a woven material.

7. A device as in claim 1 wherein a blade of the plurality of blades includes:
   a body portion made of a first woven material having a first tensile strength; and
   at least one reinforcement portion each made of a second material disposed radially along the blade and having a second tensile strength greater than the first tensile strength.

8. A device as in claim 7 wherein the blade further includes a material adding stiffness to the woven material.

9. A device as in claim 1 wherein the rim includes a rotor portion of an electric generator.

10. A device as in claim 9 wherein the rotor portion of the electric generator includes a plurality of magnets disposed circumferentially around the rim.

11. A device as in claim 1 wherein the mount includes a stator portion of an electric generator.

12. A device as in claim 11 wherein the stator portion of an electric generator includes a plurality of electric coils positioned to generate electromotive force upon rotation of the rotor.

13. A device as in claim 11 wherein the mount further includes a mechanism for adjusting a radial position of the stator portion relative to the axis of rotation.

14. A device as in claim 1 wherein the mount includes:
    a first portion adapted for fixed attachment to a foundation; and
    a second portion adapted for attachment to the rotor and movably attached to the first portion to reconfigure the mount between a first configuration and a second configuration;
    wherein in the first configuration the rotor axis of rotation is substantially horizontally relative to a ground plane, and
    wherein in the second configuration the rotor axis of rotation is substantially vertically relative to the ground plane.

15. A device as in claim 14 wherein the mount further includes a forceful mechanism moving the first and second portions between the first configuration and the second configuration.

16. A device as in claim 15 wherein the forceful mechanism includes a hydraulic actuator.

17. The device of claim 1, wherein the plurality of blades have a first end that is substantially parallel to the axis of rotation, and a second end that is substantially perpendicular to the axis of rotation.

* * * * *